United States Patent [19]

Bergsten et al.

[11] 4,291,636
[45] Sep. 29, 1981

[54] SOLID REFUSE DISPOSAL PROCESS

[75] Inventors: Victor E. Bergsten, East Amherst; Edward P. Eardley, Getzville; Theodore F. Fisher, Tonawanda, all of N.Y.

[73] Assignee: Union Carbide Corporation, New York, N.Y.

[21] Appl. No.: 154,520

[22] Filed: May 29, 1980

[51] Int. Cl.³ .............................. F23G 7/00; C10J 3/02
[52] U.S. Cl. .................................... 110/346; 110/229; 110/234; 110/216; 110/238; 48/111; 48/197 A
[58] Field of Search ............... 110/229, 230, 219, 215, 110/216, 238, 346, 345, 234; 48/111, 197 A

[56] References Cited
U.S. PATENT DOCUMENTS 2,654,664 10/1953 Reichl et al. .
3,702,039 11/1972 Stookey et al. .
3,729,298 4/1973 Anderson .
3,820,964 6/1974 Janka .
3,874,116 4/1975 White .................................. 48/111
3,926,582 12/1975 Powell, Jr. et al. .
3,971,639 7/1976 Matthews .
4,019,896 4/1977 Appleby .............................. 110/215
4,042,345 8/1977 Anderson .
4,052,173 10/1977 Schulz .
4,223,614 9/1980 Bankhuus et al. .................. 110/238

OTHER PUBLICATIONS

Wet Air Oxidation—An Alternate to Incineration, CEP, Aug. 1979, pp. 46-52.

Primary Examiner—Henry C. Yuen
Attorney, Agent, or Firm—John C. LeFever; Stanley Ktorides

[57] ABSTRACT

Process for solid refuse disposal in which a vertical shaft furnace is maintained at 30-250 psia, part of the recycle-condensate is filtered to form liquid waste a portion of which is incinerated with a minor part of the product gas to form hot exhaust gas used to heat feed water in steam boiler zone, and energy from the resulting steam is recovered as part of the process energy requirement.

12 Claims, 2 Drawing Figures

SOLID REFUSE DISPOSAL PROCESS

BACKGROUND OF THE INVENTION

1. Field of the Invention

This invention relates to solid refuse disposal, and more particularly to a process in which oxygen-enriched gas is used to convert solid refuse in a vertical shaft to molten metal and slag, and an overhead gas having fuel value.

2. Description of the Prior Art

Anderson U.S. Pat. No. 3,729,298 describes a solid refuse disposal process which has as products a useful fuel or synthesis gas and an inert solid residue. The Anderson process involves the introduction of refuse into the top of a vertical refractory-lined furnace with the simultaneous introduction of an oxygen-enriched gas into the base of the furnace. The refuse forms a porous packed bed within the vertical furnace which can be analyzed in terms of three functional zones: a drying zone at the top section, a pyrolysis zone in the mid-section, and a combustion or melting zone (the hearth) at the base of the furnace. Apparatus useful for practicing the Anderson process is also described in U.S. Pat. Nos. 3,801,082 and 3,985,518 to Anderson.

As the refuse descends through the furnace under the influence of gravity, it is first dried by hot rising gases which are generated in the mid-section and hearth of the furnace. These gases are cooled as they give up their heat to the refuse. As the at least partially dried refuse descends further into the furnace, it is exposed to still higher temperatures resulting in the pyrolysis of the organic content of the refuse. During the pyrolysis phase, the combustible organic material is decomposed in the presence of a hot oxygen-deficient (reducing) atmosphere to a solid char residue and a gaseous mixture consisting predominantly of carbon monoxide, hydrogen and a variety of hydrocarbons. The gaseous mixture rises from the pyrolysis zone while the char and remaining non-volatile inorganic materials descend into the combustion and melting zone or hearth. In the hearth, the char, which is composed primarily of fixed carbon and ash, is reacted exothermically (combusted) with an oxygen-enriched gas.

The Anderson incineration system obviates many of the previous problems surrounding solid refuse disposal, in that the solid refuse conversion results in production of a useful product gas and a biologically inactive slag residue. Although the Anderson system is a substantial improvement relative to the prior art systems of solid refuse disposal, there are certain remaining problems relating to large scale use. If this system is operated in the conventional low pressure manner, high rate refuse processing requires a converter furnace diameter so large as to dictate field construction. Such field construction is not able to utilize the controlled fabrication methods available in factory construction and results in high construction costs. At the same time, operation of the conversion step at low pressure results in relatively high volume of overhead gases which also contributes to substantial equipment costs for the downstream cooling and cleanup processing. Another disadvantage of the low pressure conversion step involves the need for additional gas compression of the product fuel gas before it can be supplied for any use. This involves an additional piece of equipment and substantial energy which adds to the complexity and expense of the overall system.

Still another disadvantage of the prior art Anderson system is that although the refuse conversion produces the useful product fuel gas stream and the inert slag residue, it also produces a contaminated wastewater stream. The latter contains organic contaminants produced during the conversion step, and requires additional treatment such as discharging into an existing sewer system or construction of a separate wastewater treatment system. Such additional wastewater treatment systems have usually been of the biological treatment type such as the oxygen enriched aeration-activated sludge UNOX System developed by Union Carbide Corporation.

An object of the present invention is to provide an improved solid refuse disposal process of the vertical furnace type which is substantially smaller for a given throughput than heretofore required.

Another object is to provide an improved solid refuse disposal process which can provide the product gas at the desired consumption pressure without needing separate gas compression.

Still another object is to provide such an improved process requiring lower overall power consumption.

A further object is to provide a process having improved ultimate disposal of the liquid waste formed during pyrolysis of the solid refuse.

Other objects and advantages of this invention will be apparent from the ensuing disclosure and appended claims.

SUMMARY

This invention relates to a process for disposal of solid refuse feed by conversion to useful gaseous product and inert solid residue. This is accomplished in a vertical column with an upper end providing a drying zone for fresh solid refuse feed and a lower end providing a thermal decomposition zone for the refuse. A hearth is located beneath the column as a combustion-melting zone. At least 40% oxygen by volume is separated from air and fed to the combustion-melting zone, and molten residue is discharged therefrom. Fine particulate-containing overhead gas is discharged from the column upper end, and the overhead gas is cleaned by cooling and scrubbing with recycle condensate from a scrubbing-separation zone to provide product gas.

More specifically, the improvement of this invention comprises:

(a) maintaining the vertical column and the hearth at pressure between 30 and 250 psia, (b) dividing the bottom condensate from the scrubbing-separation zone into three parts, (c) mixing a first part of the bottom condensate as a portion of the recycle condensate with the overhead gas for cooling and partial scrubbing thereof in said scrubbing-separation zone to form partially scrubbed overhead gas, (d) cooling a second part of the bottom condensate by externally supplied refrigerant and contacting the so-cooled second part with the partially scrubbed overhead gas from (c) in the scrubbing-separation zone, (e) filtering the third part of the bottom condensate in a first filter section to remove solid particulate material from the third part and form liquid waste having an organic portion, (f) flowing a minor portion of the liquid waste from (e) through a second filter section previously loaded with solid particulate from the bottom condensate third part (e) and removing the solid particulate to form a slurry recycle, (g) mixing the slurry recyle with fresh solid-refuse to form the refuse feed, (h) flowing the remaining major portion of the liquid waste (e) to an incineration zone, (i) diverting a minor part of the product gas while discharging the product remainder from the process, and passing the so-diverted product gas to the incineration zone (h), (j) providing air and passing same to the incineration zone, (k) completely oxidizing the organic portion of the liquid waste remainder in the incineration zone (h) and forming hot discharge gas therein, (l) flowing the hot exhaust gas to a steam boiler zone along with feed water for heat exchanging therein, and generating steam from said feed water while partially cooling the exhaust gas, (m) discharging the steam from the boiler zone (l), and recovering energy therefrom as part of the refuse disposal process energy requirement.

As used herein, the term "refuse" includes not only conventional municipal refuse and garbage which commonly contains such combustible materials such as wood, food, waste paper and non-combustible materials such as metal and glass, but also other waste or solid fuel materials including but not limited to such materials as sawdust, wood chips, coal and bagasse, which contain a substantial organic and therefore pyrolyzable fraction.

In a preferred embodiment of this invention the refuse is pelletized before introduction to the vertical shaft. As used herein, the expression "pelletized refuse" includes not only refuse which has been compacted into a cylindrical or other shaped block using an apparatus such as that disclosed in Pelton U.S. Pat. No. 4,133,259, but also refuse such as wood which in its raw state may satisfy the pelletation requirements of Anderson U.S. Pat. No. 4,042,345. "Pelletized refuse" also includes other forms of compaction such as briquetting or roll pressing.

In another preferred embodiment, preheated air is passed to the incineration zone as step (j) and the partially cooled exhaust gas from steam boiling zone (l) is heat exchanged with externally supplied air to provide the aforementioned preheated air.

DETAILED DESCRIPTION

Figure 1:
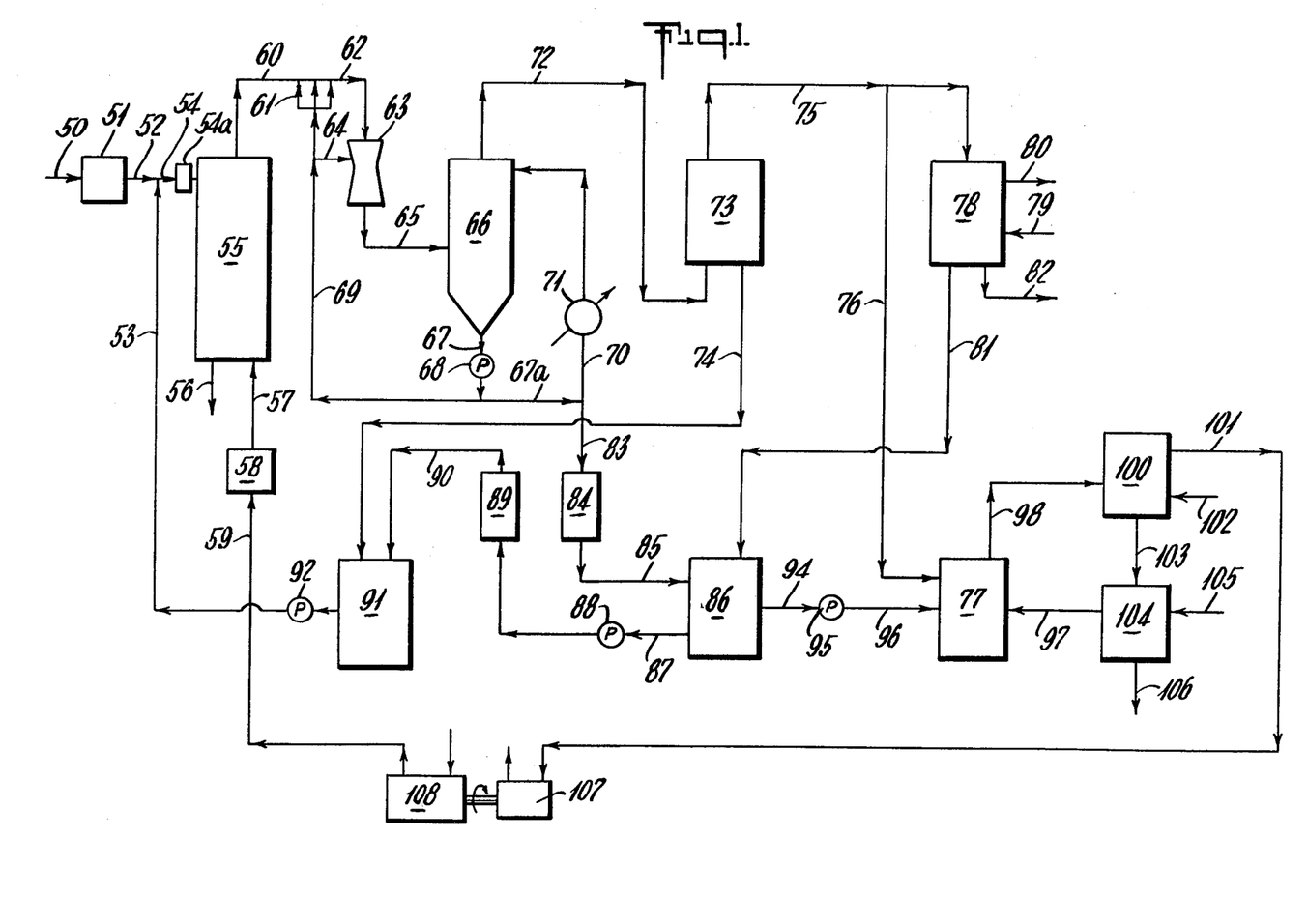
FIG. 1 is a schematic drawing of apparatus suitable for practicing one embodiment of the instant process.

Referring now to FIG. 1, the raw incoming refuse is introduced through conveyor 50 to the refuse handling section 51. The latter is a front end facility with suitable arrangements for receiving the raw refuse, storage, and pretreatment of the refuse so it is a suitable feedstock to the refuse converter. This section could include a classifying operation which might be a suitable trommel (rotating screen drum) to classify the incoming refuse by size groups, such as less than 6 inches, less than 12 inches, and greater than 12 inches. The larger group (greater than 12 inches) could then be processed through an appropriate cutting or shredding operation for size reduction. The fresh refuse could be subjected to a salvage operation such as magnetic recovery of metallic content so that this metallic content may be sold to metal recycle operations. The treated and sized refuse in conduit 52 becomes the basic input material to the vertical shaft refuse converter 55. The refuse in conduit 52 which represents the fresh refuse input is combined with a slurry recycle from conduit 53 which is recovered from other process steps as will be described hereinafter. The combination of sized refuse and slurry recycle in conduit 54 is mixed and preferably pelletized in element 54a to form the refuse fed to the upper part of the vertical shaft converter 55. For present purposes, the particular operations within the vertical shaft converter 55 will be described in detail in connection with FIG. 2.

Vertical shaft converter 55 is provided with suitable tuyeres (or oxygen blow pipes) for introducing the at least 40% oxygen by volume gas stream through conduit 57 near the converter lower end. This gas is supplied by air separation plant 58 receiving compressed air through conduit 59. The air separation plant may for example be the pressure swing adsorption type or the cryogenic type, the latter being more economical for high rate oxygen requirements exceeding about 30 tons contained oxygen per day.

The refuse is converted in vertical column 55 by passing through essentially three zones. The top first zone is a drying zone wherein most of the water content of the refuse is vaporized along with some of the more volatile organic components. The second or middle zone of the converter is a pyrolysis zone whereby the refuse is exposed to hot non-oxidizing gases rising from the bottom of the converter thereby vaporizing and driving off organic matter from the refuse. At the bottom of the converter, the char produced from the pyrolysis reaction is oxidized to a combination of carbon monoxide and carbon dioxide with sufficient heat generated to both melt or slag remaining metallic and inorganic components of the refuse and supply heat for the pyrolysis reaction. This slag is removed from the bottom of the vertical converter 55 and water quenched to produce a biologically inert and sized solid residue in conduit 56 for further processing. The hot gases rise through the refuse bed in the vertical shaft and exit from the top of the column. The overhead gases discharged through conduit 60 are a mixture of water vapor, carbon monoxide, hydrogen, carbon dioxide and a variety of organic, tar and oily vapors. Additionally, these gases may contain fine particulate matter (primarily unburned char solids) which is entrained in the gas stream. Since the refuse conversion step is performed in vertical unit 55 at pressure conditions ranging from about 30 psia up to about 250 psia, the overhead gases are available at that pressure range and at a temperature ranging from about 300° to 600° F.

The hot and pressurized fine particulate-containing gas stream in conduit 60 is next processed in a series of cooling and scrubbing steps to produce a product gas stream containing primarily fuel gas components including carbon monoxide, hydrogen, and methane along with other gas constituents such as carbon dioxide and remaining water vapor and a liquid fraction containing a combination of the particulate matter, tar, and oily phases, all suspended in condensed water. The fine particulate-containing gas stream is first partially cooled by spray nozzles 61 which introduce liquid water into conduit 60 thereby causing the gases to cool by vaporizing the water. This partially cooled stream in conduit 62 is then passed to a Venturi scrubber 63 for combination with a liquid condensate recycle stream from conduit 64 in such a manner that the gas is thoroughly mixed and contacted with the liquid. This scrubbing action has the purpose of collecting substantial particulate content of the gas stream into the liquid phase.

The combined gas-liquid stream discharged from Venturi scrubber 63 into conduit 65 is then introduced to the gas scrubber-separator 66. The bottom portion is a vessel which phase separates the entering mixture. The liquid is separated and descends to the bottom and is withdrawn through conduit 67 as the liquid condensate for flow by pump 68 therein. A first part of the liquid condensate is removed through branch conduit 69 and a portion thereof is the source of liquid for spray headers 61 while the remainder is introduced to Venturi separator 63 through conduit 64. Together these streams are part of the recycle condensate required for separation of fine particles from the overhead gas discharged from vertical column converter 55.

The liquid remainder from gas scrubber-separator 66 bottom in conduit 67a is divided into two more parts. The second part is diverted through branch conduit 70 and cooled by externally supplied refrigerant, e.g. water, in heat exchanger 71. The so-cooled condensate second part is introduced to the top of scrubber-separator 66 which for example may comprise a trayed section for contacting the rising gas with the descending cooled condensate second part. This additional recycle condensate further ensures separation from the rising gas of remaining particulates, tar and oily phases. Following this contacting step the cleaned gas is discharged from the upper end of scrubber-separator 66 into conduit 72 for further processing.

The aforedescribed portion of the overall process offers several advantages (compared to prior art systems) for effective separation of the fine particulate-contaminated hot gas overhead in conduit 60 into clean gas in conduit 72 and combined particulates, tar, oil and condensed water components in bottoms stream 67. This separation is achieved without introduction of external refrigerant such as water, directly into the system. The cooling required for this step is introduced indirectly by heat exchanger 71 so that additional water is not contaminated with any waste associated with the refuse conversion. The only aqueous phase present in the system is the condensed water originally present in the refuse or formed by the pyrolysis process within the refuse converter. This processing arrangement is also very advantageous from the standpoint of reducing processing loads on other portions of the overall refuse disposal system. Additionally, operation of this system at the same pressure as the refuse conversion (except for the necessary pressure drop through the equipment) ensures that equipment sizes are advantageously small. It should be noted that the Venturi scrubber 63 does require significant gas phase pressure drop for effective operation. Availability of the hot off gas at elevated pressure allows use of such equipment.

Although not essential, the product gas in conduit 72 may be further cleaned by passage through electrostatic precipitator 73 for removal of remaining particulate matter. The latter may be both small char particles and small droplet (micron and submicron) tar and oil content. By way of illustration, the electrostatic precipitator 73 could be a multiple rod and tube unit serving to charge the droplets and cause them to collect on the tube surfaces. Following such collection, the tar and oil fluid flows to the bottom of the tubes and is collected in an appropriate sump. This remaining particulate is withdrawn through conduit 74 for recovery and recycle to the refuse converter 55. The further cleaned product gas stream is discharged from electrostatic precipitator 73 in conduit 75 and now primarily contains the fuel components carbon monoxide and hydrogen along with carbon dioxide and water vapor.

At this point the further cleaned product gas stream in conduit 75 is still pressurized and contains a significant concentration of water vapor. A minor part, preferably 10 to 25 mol% of this gas is diverted through branch conduit 76 to incinerator zone 77 for complete oxidation of the organic portion of a liquid waste remainder stream. The remaining major part of this further cleaned product gas stream is preferably directed to condenser 78 where additional cooling is supplied by cold water in conduit 79 for indirect heat exchange. The warmed cooling water is discharged from condenser 78 through conduit 80. The so-condensed water from the further cleaned product gas is removed through conduit 81 for further processing as hereinafter described, while the dried product gas is discharged from condenser 78 through conduit 82 for use as desired.

Dried and clean product gas in conduit 82 is available at pressure as determined by the pressure level of the vertical refuse converter 55 and pressure drop through the downstream processing equipment. This pressure level is preferably selected so that the product is sufficient for direct use in the desired consumption means, as for example a fuel gas burner. Availability of this product gas at substantial pressure is an important advantage relative to prior art refuse disposal-combustible product gas systems in that additional complex and expensive compression of the gas is not normally required. Even for those few end uses where the refuse converter pressure operation at 30 to 250 psia would not provide the product gas at pressure sufficient for direct use, the suction pressure to any required gas compressor would be elevated. This would reduce gas compressor energy and equipment requirements. As previously explained, this product gas has substantial carbon monoxide and hydrogen content and could be utilized for its fuel value or as a synthesis gas for chemical and manufacturing purposes.

Returning now to the condensate in conduit 67a, it was previously indicated that a second part is diverted through branch conduit 70 for cooling and return to the upper end of gas scrubber-separator 66 as a portion of the recycle condensate. The third part of this condensate constitutes the remainder of that withdrawn from the lower end of scrubber-separator 66, and is preferably between 1.5 and 5.0 wt.% of the total bottom condensate in conduit 67. This third part is directed through branch conduit 83 to first filter section 84. This liquid is a combined organic liquid and water stream containing solid particulates (such as unburned char particles) carried over from vertical column refuse converter 55. The filtering step removes this solid particulate material to form a liquid waste stream which is discharged from first filter section 84 into conduit 85 and thence into liquid waste storage tank 86. The latter also receives condensate in conduit 81 from product gas cooler 78, thereby providing means for disposal of contaminants in this stream. The liquid waste is now free of particulate matter and contains the aqueous and oily phases. Since the first and second parts of the condensate withdrawn from scrubber-separator 66 are recycled, the only net removal of particulate from this condensate is by way of the third part in the filtration section 84, 89.

It should be noted that the condensate in conduit 67 must be of sufficient quantity and recirculation inventory to perform the scrubbing function and also permit efficient solids removal in the filter section. The condensate third part must be of sufficient quantity for this removal without filter plugging even when the solids concentration is high, and therefore is preferably at least 1.5 wt. % of the total bottom condensate. On the other band this third part should not be so large as to reduce the effectiveness of the scrubbing action when the solids concentration is low, so is preferably no more than 5 wt. % of the total bottom condensate.

The filtering step is preferably a batch operation in that one section is maintained "on stream" for a predetermined time period (either based on control of absolute time or degree of particulate loading). During at least part of the first filter "on stream" operation, a liquid waste minor portion preferably comprising 5 to 20 wt. % of the total liquid waste is withdrawn from storage tank 86 through conduit 87 having pump 88 therein, and flowed through second filter section 89. The latter has been previously loaded with particulate from the third part of condensate 67 supplied by branch conduit 83. The flow direction of liquid waste to second filter section 89 is opposite that of condensate third part during the preceeding "on stream" period, so backwashing occurs. The actual portion of the total liquid waste used for backwashing is determined by the solids concentration in the condensate third part, i.e. preferably at least 5 wt. % of the total for low solids concentrations and preferably no more than 20 wt. % of the total liquid waste for high solids concentrations. To control the solids concentration of the liquid entering first filter section 84 and thus not overload same, a portion of the liquid waste may be recycled from conduit 87 to conduit 83 by means not illustrated. The two illustrated sections 84 and 89 of the particulate filtration zone are piped for parallel flow operation using unillustrated conduits and valving, but well understood by those skilled in the art. Additional filtration sections could also be provided and piped in this same manner. The resulting particulate-liquid waste mixture is discharged from backwashed second filter section 89 into conduit 90 as a slurry, and is directed to slurry recycle storage tank 91.

The slurry recycle storage tank 91 collects not only slurry from the filtration zone 84, 89 but also particulate material recovered from the optional electrostatic precipitator 73 through conduit 74 (if the same is employed). The slurry from storage tank 91 is transferred by pump 92 in conduit 53 and recycled to refuse feed conduit 54 (upstream pelletizer 54a if the same is used). This slurry recycle step ensures that particulate matter is not introduced to the liquid waste incinerator 77.

The major portion of the particulate-free liquid waste not used for filter backwash is withdrawn from storage tank 86 through conduit 94 and flowed by pump 95 therein to waste incinerator 77. This liquid waste major portion stream contains most of the water content condensed from the overhead refuse converter gas in conduit 60, and also contains a variety of organic contaminants including a range of alcohols, aldehydes, and other residual organic compounds which may be formed during the refuse conversion step.

Discharge of the so-contaminated waste liquid from storage tank 86 without further treatment is not acceptable from the environmental standpoint. Discharge of this waste stream into municipal sewer systems would impose a severe load on such systems. Further, separate biological treatment facilities are not desirable because the high organic strength waste is not easily handled and requires complex and expensive processing facilities. According to this invention, it has been discovered that incineration of this liquid waste stream with a minor part of the product gas is a simple and economic means of treating the liquid waste. Incinerator 77 may be a commercially available refractory lined vessel with associated spray nozzles for introducing the liquid waste, and fuel and air nozzles for introducing the product gas minor part through conduit 76 and an air stream through conduit 97. Within incinerator 77 the liquid waste remaining portion from conduit 94 is completely vaporized and raised in temperature to at least 1600° F. (preferably 1900°). The waste is maintained at this temperature for sufficient duration to completely oxidize all organic contaminants, e.g. between one and two seconds. The energy for this incineration comes from two sources: the organic contaminants and the product gas minor part. If the organic concentration in the liquid waste is relatively high the percent of product gas diverted through conduit 76 may be relatively low; the converse is also true recognizing that the water content of the liquid waste must be heated to the aforementioned temperature level. The preferred range of 10 to 25 mol% for the product gas diversion reflects the expected range of organics concentration in the liquid waste.

The hot gas formed in incinerator 77 is discharged through conduit 98 to steam boiler zone 100 where part of the heat energy of the exhaust gas is recovered by indirect heat exchange. Feed water is introduced to steam boiler zone 100 for this heat exchange, high pressure and high temperature steam is formed therefrom and discharged in conduit 101.

The partially cooled incinerator discharge gas is removed from steam boiler zone 100 in conduit 103. If desired, further sensible heat may be recovered from this gas in preheater 104. Externally supplied air is introduced through conduit 105 for indirect heat exchange with this partially cooled incinerator discharge gas and thereby preheated. The so-preheated air is discharged through conduit 97 and introduced to incinerator 77 as the oxygen source. The further cooled incinerator gas is expelled from preheater 104 through conduit 106.

Incinerator gas 106 contains chlorine and sulfur compounds (usually as HCl and $SO_2$) formed from components of the refuse feed. Most municipal refuse compositions are such that the concentration of these contaminants in exhaust gas 106 is too low for environmental concern. If however this is a problem the contaminants may be removed by a scrubber (not illustrated) as is well understood in the art.

Steam discharged from steam boiler zone 100 in conduit 101 is processed for energy recovery as part of the refuse disposal process energy requirement. By way of illustration this energy may be used to supply part of the air separation plant 58 energy requirements. As illustrated this steam in conduit 101 is used in steam turbine drive 107 for air compressor 108. That is, drive 107 is mechanically joined to compressor 108 by shaft 109, and feed air is compressed to about 70 to 100 psia therein before passage through conduit 59 to air separation plant 58. Alternatively the steam in conduit 101 may be used to generate electricity which in turn is used to drive air compressor 108 or other apparatus components of the refuse disposal process requiring electricity. These for example may include pelletizer 54a and pumps 68, 92 and 95.

Direct utilization of the steam in turbine drive 107 is preferred from the standpoint of simplicity and efficiency. That is, recovery of the incinerator discharge gas energy to both drive air compressor 108 and preheat feed air to the incinerator is a near optimum balance between energy availability and needs, and represents a preferred embodiment of the invention. Part of this available energy is used to compress the air separation plant feed air to the level needed for either cryogenic or pressure swing adsorption division into oxygen and nitrogen, e.g. 70–100 psia. The remainder of this energy is sufficient for preheating of the feed air requirement of incineration zone 77 to 500°–800° F. This temperature level is preferred for preheating as special materials are not required for construction of preheater 100. The aforedescribed preferred energy generation-recovery combination minimizes the external energy requirements for the solid refuse disposal process of this invention.

Figure 2:
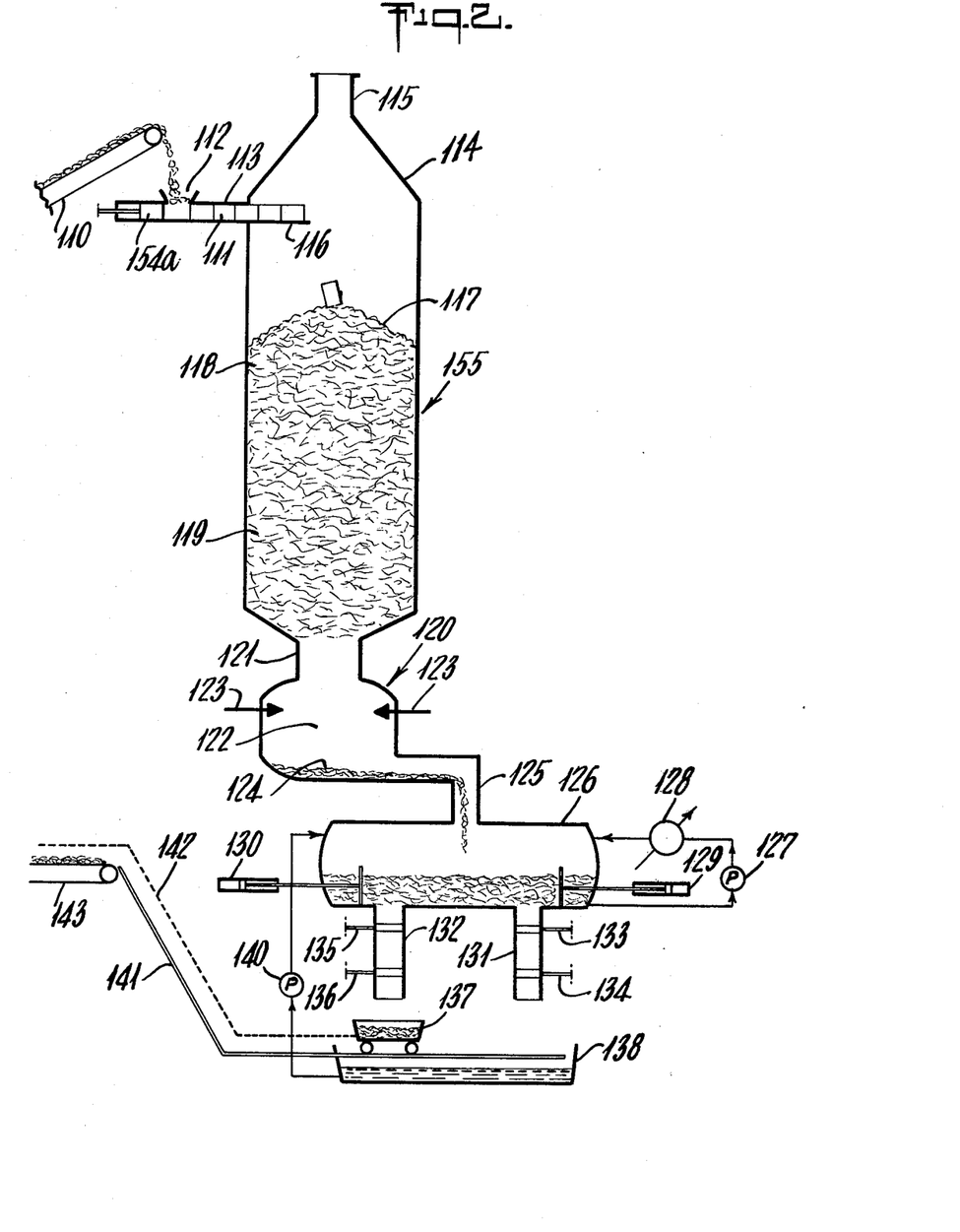
FIG. 2 is a schematic drawing of a vertical shaft-hearth furnace suitable for use in the present invention.

FIG. 2 illustrates in more detail, a suitable vertical column furnace 155 suitable for practicing the process of this invention. The Figure also includes all apparatus needed for feeding the refuse, converting it in the aforementioned three zone manner, and recovering the overhead gas and slag residue. Where appropriate, corresponding elements to those in FIG. 1 have been identified by the same number plus one hundred.

The assembly includes refuse conveyor 110 which supplies both sized fresh refuse and the waste recycle slurry to the top of the converter. The mixture is introduced through top opening 112 to pelletizer 154a which compacts the loose refuse, for example by a suitable ram device into cylindrical blocks or pellets, as described in Pelton U.S. Pat. No. 4,133,259. The refuse pellets are highly compressed entities ranging in diameter from about 6 inches to about 18 inches with 14 inches as a typical diameter. The length of any particular pellet may range from several inches to more than 1 foot, and they are forced through a tubular duct 113 serving as a conduit for feeding the refuse to the converter. The force feed of these pellets 111 in tubular duct 113 along with the "string" of pellets forms a gas seal at the top of the converter. The gas seal is formed by multiple pellets with combined length equivalent to about five pellet diameters for the aforementioned pellet size range. The converter has a conical section 114 connected to a reduced diameter outlet flange 115 used to carry out the exiting overhead gases.

If the refuse feed is not pelletized, the gas seal needed for maintaining positive pressure in converter 155 may be provided by a lock hopper and pressurized gas, as for example nitrogen from the air separation plant.

As the pellets are fed into the vertical column converter vessel they are moved into open trough 116 which extends to the column central region (in the radial direction) where they fall onto the refuse bed 117, retained within the preferably steel wall refractory lined vessel. From the process standpoint, refuse bed 155 has a drying zone 118 in the highest section, and pyrolysis zone 119 in the middle section. Within the drying zone the refuse is dried of its water content as it moves downwardly. Also, relatively light or volatile organic materials are vaporized within this zone. As the now dry refuse continues to move downwardly it is subjected to rising hot reducing gases and the refuse is further decomposed in terms of removing additional organic content of the refuse. Additional carbon monoxide, hydrogen, and light hydrocarbons may be formed from breakdown of heavy organic components within the refuse when it is heated by the reducing gases. The relatively non-volatile components of the refuse including carbon, metallic, and inorganic materials are retained and pass to the bottom of the converter 155. In the FIG. 2 furnace converter embodiment the refuse bed is primarily supported by the bottom conical section of the converter. As the refuse bed 155 is converted, material gradually flows through the bottom restricted opening section 121 into the slagging hearth zone 122. Within this hearth zone 122, the at least 40% oxygen gas is introduced by appropriate tuyeres or oxygen blow pipes 123. Within this zone 122, the oxidant reacts with the carbon to form the combustion energy necessary to melt or slag all the metal and inorganic components. The hot gases then rise through restricted opening section 121 and participate in the subsequent pyrolysis and drying reactions prior to gas exit through outlet flange 115.

The slagging materials 124 are removed from the hearth zone 122 by slag tap conduit 125. Remaining sections of the refuse disposal system are associated with quenching this slag material so as to form the aggregate material which can be removed. This apparatus includes quench tank 126 and its associated lock hoppers, pump systems and mechanical slag moving components. As the slag material 124 flows to the water reservoir within quench tank 126, it is cooled and fractures into a sized aggregate material. The coolant required for this step is supplied by recirculating water pump 127 and associated water cooler 128. Slag material 124 is moved by actuating hydraulic piston and scraper assemblies 129 and 130 to move the slag to openings associated with lock hoppers 131 and 132.

These lock hoppers may be large tubular sections each including two valves to allow alternate removal of slag material. Valves 133 and 134 are associated with lock hopper 131 whereas lock hopper 132 has valves 135 and 136. Typical operation of the lock hopper 131 would include closing valve 134 and opening valve 133. At this point scraper unit 129 is actuated to move slag to the opening associated with lock hopper 131 and thereby fill it with slag material and water from the quench tank 126. Valve 133 is then closed and now valve 134 is opened to remove the slag-water aggregate from lock hopper 131. The aggregate material is collected in slag car 137 and the water flows to water sump 138. This water is returned to quench tank 126 by pump 140 through conduit 139. The slag could be removed from the area in car 137 up. associated incline 141 by cable 142 to slag removal conveyor 143. This slag conveyor 143 then removes the slag aggregate product to a suitable storage or transport area.

As previously explained, one characteristic of this process is that essentially all of the solid particulates present in the overhead gas from the vertical column converter are collected in the slurry recycle added to the fresh refuse feed. This recycle ensures complete conversion of the solid refuse to either product gas, nonobjectionable water or carbon dioxide vent gas, or slag, thereby minimizing refuse handling problems. The relatively small slurry recycle minimizes fluid loading in the vertical column converter. The only liquid recycle to the converter is the backwash liquid needed for particulate removal from the loaded filter section, and this may represent as little as 10% of the total liquids formed by the refuse conversion. Such minimum liquid recycle reduces both the oxygen requirement in the converter and the converter gas load.

The prior art has assumed that it was desirable to recycle all of the process liquid (except water) to the refuse converter from the standpoint of added fuel gas production. Thus, referring to FIG. 1, the prior art would utilize a phase separator tank instead of liquid waste storage tank 86, and recycle all liquids (other than wastewater contaminated with soluble organics) to feed refuse conduit 54 upstream pelletizer 54a. Although such practice does produce more overhead gas from the converter and thereby more clean fuel gas, this also means that more of the fuel gas would be required for incineration of the organic portion of the liquid waste. We have unexpectedly discovered that employing minimum liquid waste recycle pursuant to this invention yields substantially higher net product fuel gas production than the maximum recycle consistent with prior art practice. This is illustrated by the following example.

EXAMPLE

This example is based on a system for disposal of pelletized refuse as schematically illustrated in FIGS. 1 and 2. The system is designed to process 33,325 lbs/hr. of fresh municipal solid refuse (conduit 50), and process characteristics are summarized in Table A. The vertical column furnace section 155 (above hearth connection 121) is a cylinder of 116.3 ft$^2$ cross-sectional area and 46.8 ft. long including the conical ends. The restricted opening connection 121 between the cylindrical section and the hearth is a cylinder of 11.0 ft.$^2$ cross-sectional area and 2.7 ft. long. Hearth 120 has the configuration of a short cylinder with dished heads, a maximum cross-sectional area of 28.5 ft.$^2$ in the center, and a total volume of 148.7 ft$^3$. There are twenty tuyeres 123 each comprising a 3 inch diameter pipe uniformly spaced transversely around the hearth shell circumference. These tuyeres are located in the upper part of the hearth adjacent to connection 121 and 30% of the vertical distance from the connection 121 longitudinal middle to the hearth floor. Also the tuyeres are inclined downwardly and away from connection 121 so that the oxygen-containing gas does not impinge directly against the pelletized refuse bed. The aforedescribed vertical column-hearth-tuyere apparatus is not part of the present invention but is described and claimed in copending application Ser. No. 154,519, "Solid Refuse Disposal Apparatus", filed contemporaneously with this application in the names of V. E. Bergsten et al and incorporated herein by reference. The pelletized refuse may for example enter the vertical column converter in the form of cylindrical blocks of about 13 inches diameter, 4 to 16 inches length and about 35 to 45 lbs/ft.$^3$ density. The estimated process performance is summarized in Table A.

The Table A performance in accordance with this invention may be compared with operation of the same apparatus with maximum recycle as would be practiced by the prior art. That is, the fluid recycled in conduit 53 would be not only the slurry-liquid waste backwash from the filter section but also all of the liquid waste from storage tank 86. This comparison is summarized in Table B.

Table B shows that on a weight basis the instant process provides about 12% more product gas per pound of fresh refuse feed, than the prior art. Also, minimum slurry recycle can return the solid particulates to the converter thereby minimizing the gas loading therein. These solid particulates would otherwise be passed to the incinerator and be detrimental to its operation since the particulates would tend to plug the incinerator nozzles and to foul the downstream heat exchange equipment. The process of this invention reduces equipment loadings for a given capacity refuse disposal system.

It has previously been indicated that according to this invention the vertical shaft converter is maintained at pressure between 30 and 250 psia. Lower pressures would require repressurization of the product gas by a separate compressor for many end uses. Also, this pressure level is needed to increase the vertical column converter capacity sufficiently to permit fabrication of a vessel of shippable diameter. Pressures above 250 psia would present problems with respect to the gas seal associated with the refuse feeder assembly schematically illustrated in FIG. 2. Although it is possible to increase the realizable pressure differential across this seal by additional compaction of the pellets, more closely spaced pellets or stringing, probably a higher pressure differential than that required with 250 psia would require a different and more complicated feeder mechanism. A pressure range of 50 to 100 psia is preferred from the standpoint of increased refuse capacity and availability of product at pressure, while avoiding more complicated feeder mechanisms.

Although preferred embodiments of the invention have been described in detail, it will be appreciated that other embodiments are contemplated along with modifications of the disclosed features as being within the scope of the invention.

TABLE A

| | ESTIMATED PROCESS PERFORMANCE | | | | | | |
|---|---|---|---|---|---|---|---|
| Plant Input/Output | Fresh Refuse Feed | Oxygen | Slag | Product Gas | Incinerator Fuel Gas | Liquid Waste | Recycle Slurry |
| Steam No. (FIG.1 or 2) | 50 | 57 | 56 | 82 | 76 | 94 | 53 |
| Rates | | | | | | | |
| LB/HR | 33,325 | 6,462 | 5,173 | 17,659 | 3,126 | 13,829 | 1366 |
| SCFM | | 1,270 | | 4,388 | 809 | | |
| GPM | | | | | | 27.6 | 2.7 |
| Ultimate Analysis | | | | | | | |
| LB/HR | | | | | | | |
| C | 9,200 | | | 7,011 | 1,107 | 1,082 | |
| H | 1,279 | | | 716 | 115 | 209 | |
| O | 7,053 | 6,304 | 342 | 9,469 | 1,462 | 172 | |
| N | 168 | 6 | | 114 | 18 | 42 | |
| S | 35 | | 18 | 15 | 2 | | |

TABLE A-continued
ESTIMATED PROCESS PERFORMANCE

| Plant Input/Output | Fresh Refuse Feed | Oxygen | Slag | Product Gas | Incinerator Fuel Gas | Liquid Waste | Recycle Slurry |
|---|---|---|---|---|---|---|---|
| Cl | 46 | | 5 | | | 41 | |
| Argon | 0 | 152 | | 132 | 20 | | |
| Metal | 556 | | 556 | | | | |
| Glass & Ash | 4,252 | | 4,252 | | | | |
| $H_2O$ | 10,736 | | | 202 | 402 | 12,283 | |
| Components Mole % | | | | | | | |
| CO | | | | 39.5 | 32.9 | | |
| $CO_2$ | | | | 22.8 | 19.0 | | |
| $H_2$ | | | | 22.9 | 19.1 | | |
| $H_2O$ | | | | 1.6 | 17.5 | | |
| Hydrocarbons | | | | 12.0 | 10.0 | | |
| Organics | | | | <0.1 | 0.5 | | |
| $H_2S$ | | | | <0.1 | <0.1 | | |
| Argon | | 1.9 | | 0.5 | 0.4 | | |
| $N_2$ | | 0.1 | | 0.6 | 0.5 | | |
| $O_2$ | | 98.0 | | — | — | | |
| Molecular Wt. | | 32.15 | | 25.44 | 24.44 | | |
| Temperature °F. | 60 | 60 | 200 | 100 | 190 | 170 | 170 |
| PRESSURE PSIA | 14.7 | 74.7 | 14.7 | 56.7 | 56.7 | 14.7 | 14.7 |

TABLE B
ESTIMATED PROCESS COMPARISON

| Process Operation | This Invention | Prior Art |
|---|---|---|
| Process Feature | Minimum Liquid Recycle to Converter | Maximum Liquid Recycle to Converter |
| Converter Recycle Characteristics | Filter Backwash Only | Filter Backwash and Non-soluble Organics Phase |
| Liquid Waste for Incineration | Condensed Water With Soluble Organics and Non-soluble Organic Phase | Condensed Water With Soluble Organics Only |
| Product Gas Production | Maximum | Minimum |
| System Mass Balance (Lb/lb Refuse) | | |
| Refuse | 1.000 | 1.000 |
| Oxygen | 0.194 | 0.201 |
| Recycle | 0.041 | 0.078 |
| Slag | 0.155 | 0.155 |
| Offgas | 1.080 | 1.124 |
| Liquid Waste | 0.415 | 0.378 |
| Incinerator Gas | 0.094 | 0.194 |
| Product Gas | 0.530 | 0.474 |

What is claimed is:

1. In a process for disposal of solid refuse feed by conversion to useful gaseous product and inert solid residue in a vertical column with an upper end for fresh solid refuse feed as a drying zone and a lower end providing a thermal decomposition zone for the refuse, and a hearth beneath said column as a combustion-melting zone, in which air is separated to produce at least 40% oxygen by volume and fed to said combustion-melting zone, molten residue is discharged from said combustion-melting zone, fine particulate-containing overhead gas is discharged from the column upper end, and said overhead gas is cleaned by cooling and scrubbing with recycle condensate from a scrubbing-separation zone to provide product gas and bottom condensate, the improvement comprising:

(a) maintaining said vertical column and said hearth at pressure between 30 and 250 psia;

(b) dividing the bottom condensate from said scrubbing-separation zone into three parts;

(c) mixing a first part of said bottom condensate as a portion of said recycle condensate with said overhead gas for cooling and partial scrubbing thereof in said scrubbing-separation zone to form partially scrubbed overhead gas;

(d) cooling a second part of said bottom condensate externally supplied refrigerant and contacting the so-cooled second part with the partially scrubbed overhead gas from (c) in said scrubbing-separation zone as another portion of said recycle condensate;

(e) filtering the third part of said bottom condensate in a first filter section to remove solid particulate material therefrom to form liquid waste having an organic portion;

(f) flowing a minor portion of said liquid waste through a second filter section previously loaded with solid particulate from the bottom condensate third part and removing the solid particulate from said second filter section to form a slurry recycle;

(g) mixing said slurry recycle with fresh solid refuse to form said refuse feed;

(h) flowing the remaining major portion of said liquid waste to an incineration zone;

(i) diverting a minor part of said product gas while discharging the product remainder from said process, and passing the so-diverted product gas to said incineration zone;

(j) providing air and passing same to said incineration zone;

(k) completely oxidizing the organic portion of the liquid waste remainder in said incineration zone and forming hot discharge gas therein;

(l) flowing said hot discharge gas to a steam boiler zone along with feed water for heat exchanging therein, and generating steam from said feed water while partially cooling the incinerator discharge gas; and (m) discharging said steam from said steam boiler zone and recovering energy therefrom as part of the refuse disposal process energy requirement.

2. A process according to claim 1 in which said refuse feed is pelletized before introduction to the vertical column upper end.

3. A process according to claim 1 in which the partially cooled incinerator discharge gas from steam boiler zone (1) is heat exchanged with externally supplied air for preheating thereof, and the preheated air comprises the air of step (j) passed to said incineration zone.

4. A process according to claim 1 in which energy recovered from said steam in step (m) is used to supply part of the air separation—oxygen production energy requirement.

5. A process according to claim 1 in which energy recovered from said steam in step (m) is used as the air compression energy for the air separation-oxygen production.

6. A process according to claim 1 in which flows are periodically switched between said first and second filter sections such that said third part of said bottom condensate is filtered in said second filter section as step (e) after particulate removal therefrom, and said minor portion of said liquid waste is flowed through said first filter section as step (f) after particulate loading thereon.

7. A process according to claim 1 in which said third part of said bottom condensate comprises between 1.5 and 5.0 wt.% of the total bottom condensate.

8. A process according to claim 1 in which the diverted minor part of said product gas in step (i) comprises between 10 and 25 mol % of the total product gas.

9. A process according to claim 1 in which said product gas from the scrubbing-separation zone is flowed through an electrostatic precipitation zone for further separation of particulate, and said particulate is returned to said slurry recycle of step (g).

10. A process according to claim 1 in which said product gas from the scrubbing-separation zone is cooled to form condensate, and said condensate is joined with said liquid waste from step (e).

11. A process according to claim 1 in which said vertical column and said hearth are maintained at pressure between 50 and 100 psia.

12. A process according to claim 1 in which the liquid waste minor portion of step (f) comprises between 5-20 wt.% of said liquid waste.

* * * * *